United States Patent [19]

Güers et al.

[11] Patent Number: 4,504,954
[45] Date of Patent: Mar. 12, 1985

[54] LASER APPARATUS

[75] Inventors: Karl Güers, Eschborn; Rasmus Beck, Neu-Isenburg, both of Fed. Rep. of Germany

[73] Assignee: Battelle-Institut e.V., Frankfurt am Main, Fed. Rep. of Germany

[21] Appl. No.: 383,256

[22] Filed: May 28, 1982

[30] Foreign Application Priority Data

May 29, 1981 [DE] Fed. Rep. of Germany ....... 3121372
Sep. 29, 1981 [DE] Fed. Rep. of Germany ....... 3138622

[51] Int. Cl.³ .............................................. H01S 3/03
[52] U.S. Cl. ........................................ 372/61; 372/34; 372/58; 372/37
[58] Field of Search .................. 372/34, 61, 58, 37

[56] References Cited

U.S. PATENT DOCUMENTS 3,634,778  1/1972  Melikian et al. ................. 372/58
4,206,429  6/1980  Pinsley ............................. 372/58
4,317,090  2/1982  Nagai et al. ...................... 372/58
4,351,052  9/1982  Sasaki et al. ..................... 372/58

FOREIGN PATENT DOCUMENTS 2916408  11/1979  Fed. Rep. of Germany .

OTHER PUBLICATIONS

Tiffany, Targ & Foster, Appln, Phys. Letters 15, (1969), pp. 91–95.
K. Gurs, Laser 75, Optoelectronics, Conference Proceedings, pp. 30–37.

Primary Examiner—William L. Sikes
Assistant Examiner—Léon Scott, Jr.
Attorney, Agent, or Firm—Fisher, Christen & Sabol

[57] ABSTRACT

In a laser device designed according to the gas transport or convection principle, the division into parts with different functions is replaced by complete integration of the different functions. In the case of an axial flow laser, the laser tube can be designed as a cooled tube and arranged concentrically inside of a circulation turbine.

13 Claims, 4 Drawing Figures

LASER APPARATUS

BACKGROUND OF THE INVENTION

1. Field of the Invention

The invention relates to a laser apparatus with a gas circulation and excitation system, which is designed according to the gas transport or convection principle.

2. Prior Art

Power, amplification and efficiency of molecular lasers, in particular $CO_2$ lasers, decrease with increasing temperature of the laser gas. The decrease in efficiency is due to the fact that with rising temperature the line width becomes larger, the excitation energy distributes among an increasing number of rotational lines, the number of deactiviating collisions increases and the population of the laser end level increases by thermal excitation, which results in a decrease in inversion of the individual transitions (K. Gürs, Laser 75, Optoelectronics, Conference Proceedings, pp. 30–37).

For this reason methods have been developed which carry off the heat together with the laser gas by circulating and cooling the gas. Lasers appropriate for this method consist of an active region in which the gas is excited, with a separate (downstream) or integrated optical resonator, of the gas transport system with a built-in cooler and a pump. As large amounts of heat have to be carried off, large gas volumes have to be transferred by pumping. The respective lasers are large and expensive, and their applications are limited.

All of the $CO_2$ lasers with output powers of more than 1 kW which are on the market operate according to this principle of gas transport or convection laser. It was first described in 1969 by Tiffany, Targ and Foster.

A conventional gas transport laser uses a high-power blower, e.g., a fan or a Roots pump, for rapid gas circulation. Depending on the arrangement of the laser resonator and the direction of gas flow, a distinction is made between tangential-flow lasers and axial-flow lasers. Both of these lasers have specific advantages and drawbacks. In the case of the tangential-flow laser, the pressure loss is relatively small because of the large flow cross section. Therefore, it is possible to maintain the necessary flow rate by means of a smaller blower than in the case of the axial-flow laser. In the case of this latter laser type it is more difficult, however, to achieve homogeneous discharge and emission in the fundamental mode. For this reason the emission of the axial-flow laser can in general be better focused.

Convection lasers, in which the gas flow is passed in axial direction through glass tubes serving as discharge vessels, have a better radiation quality which is partly due to the radially symmetric discharge conditions; their radiation can be better focused. A sufficiently high flow rate can, however, only be maintained by means of a relatively high pressure gradient within the laser tube. As a result, the discharge conditions are not uniform along the tube. A strong and heavy circulation blower (Roots pump) is necessary.

An improvement of the axial convection laser is described in German OS No. 29 16 408. This design provides for helical circulation of the gas mixture within the discharge tube by suitably designed, water-cooled baffle plates. Its passages through the active zone of the laser are only of short duration; between the passages, there is sufficient time for the heat absorbed to be dissipated. The helical baffle plates are provided with bores lying on a line parallel to the axis. Through these bores the gas discharge burns to excite the laser mixture. This arrangement has the advantages that only a relatively low circulation rate is necessary and that the longitudinal arrangement of the laser resonator ensures a high mode quality. It is difficult, however, to keep the gas discharge in place, as it is easily blown out of the resonator by the gas flow. Favorable operating conditions can be maintained only with specifically defined discharge parameters, so that the intensity of this laser type cannot be satisfactorily controlled.

BROAD DESCRIPTION OF THE INVENTION

The objective of the invention is to provide a gas transport or convection laser for generating high-power laser radiation, in which the temperature rise in the laser gas is effectively suppressed and the necessary flow rate can be maintained without sophisticated structural components.

It has been found that the object of the invention can be reached by means of a laser device (designed according to the gas transport or convection principle with a casing enclosing the gas circulation and excitation systems) in which the division of the laser into parts with defined functions has been abandoned and the various functions are fully integrated.

One embodiment of the invention involves axial-flow lasers. In the axial-flow laser the electrodes are arranged in the laser tube or in front of the laser tube in the direction of gas flow, and the laser tube is designed as a cooled tube and is arranged concentrically inside of a circulation turbine. Perferably the stator blades of the circulation turbine are fixed to the outside wall of the laser tube. The laser tube and the circulation turbine are advantageously closed by end plates provided with gas guide means. Preferably a magnet, e.g., an annular magnet, is provided for driving the turbine rotor. The magnet is taken along by the rotary field of a motor. Preferably the turbine rotor is pivoted inside a cylindrical casing and the casing extends between the end plates. Also, preferably the turbine rotor is pivoted in the end plates and the bearing is sealed by means of a sliding seal. Advantageously the sliding seal consists of a magnetic fluid which is introduced into a U-shaped magnet where it is retained. Also, advantageously the inside wall of the laser tube consists of an insulating material, and one of the electrodes is on earth potential at the gas inlet side and the other one is on operating potential at a certain distance from the first electrode. The ratio of the distance between the two electrodes to the total length of the laser tube is preferably such that on the one hand a minimum burning voltage is required and on the other hand the excited gas is completely deactivated after having left the excitation zone in the radiation field of the laser. Further, preferably several pin electrodes which are on operating potential are mounted in bores on the periphery of the end plate at the gas inlet side, the gas guide means lead into the bores and the gas flows into the laser tube through the bores. The walls of the bores serve as ground electrodes. Several laser devices are preferably connected suction side to suction side and pressure side to pressure side. The circulating turbines of all laser devices are advantageously driven by one motor via a shaft arranged paralled to the laser axis and via a toothed belt which runs over the outer casing of the respective turbine. The proposed laser devices according to the invention permit the circulation rate of the laser gas to be substantially increased. As correspondingly more heat can be carried off with the laser gas, the power of a laser of corresponding size can be increased proportional to the circulation rate. Power permit volume and power per flow rate are reduced by a factor of 3 to 5. In the device according to the invention, the components moving the gas, for example, can no longer be identified as a pump. This means that the requirements of laser design are for the first time fully satisfied and that modern technology has been introduced.

DETAILED DESCRIPTION OF THE DRAWINGS

In the following the invention is described in greater detail on the basis of schematic drawings which only illustrate one embodiment in the drawings.

Figure 1:
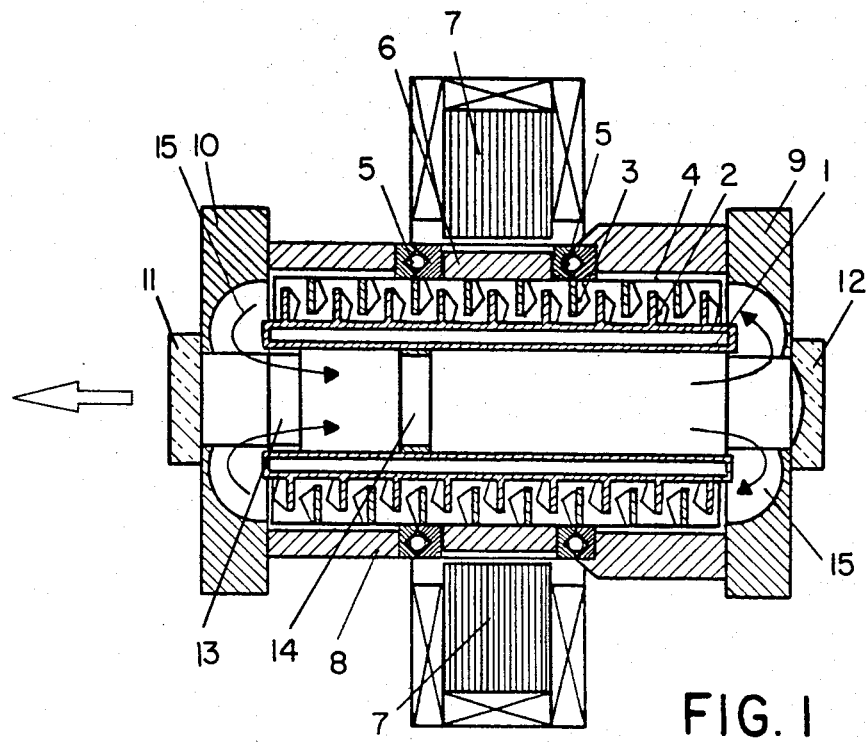
FIG. 1 is a longitudinal section of a laser device according to the invention operating according to the axial flow principle.

According to FIG. 1, the laser device according to the invention consists of central water-cooled discharge tube 1, which is coaxially enclosed by a turbine blower. Stator blades 2 of the tubrine are fixed to the outside wall of discharge tube 1. This ensures efficient cooling. Rotor blades 3 are mounted in turbine tube 4, which is supported from the outside by two ball bearings 5. Between bearings 5, annular magnet 6 is arranged, which is taken along by the rotary field of appropriate motor stator 7, thus setting the turbine rotor in motion.

The laser gas chamber is enclosed by casing 8 which, in the region of the turbine drive, has a small wall thickness to ensure that only a small gap is left between motor stator 7 and rotor. Casing 8 is fixed to end plates 9 and 10. End plates 9 and 10 carry the two mirrors 11 and 12 which form the laser resonator and which are sealed and adjustably mounted.

In another embodiment of the laser, casing turbine tube 4 can be integrated into the casing so that the wall between rotor and stator is not necessary. Turbine tube 4 then forms the outside wall of the gas chamber so that the bearings and the rotor magnet can be mounted in the outer chamber. Sealing between turbine tube 4 and end plates 9 and 10 is effected by means of a sliding seal. Such a sliding seal may favorably consist of a ferrohydrodynamic fluid, e.g., oil containing finely dispersed magnetizable material. This sealing element then consists of an annular magnet with U-gab, in which the ferrohydrodynamic fluid is retained and which is provided in the end plates. The end of turbine tube 4 extends into this gap without being in direct contact with it. The advantages of this type of seal are low friction, good sealing effect and long life.

The turbine tube and the stator tube (laser tube) can fulfil their function as transport system for the laser gas even in the absence of a seal, provided that the outer chamber also contains laser gas and that there is little exchange with the outer chamber. In the case of small gaps it is therefore possible to dispense with the sliding seal. It is necessary, however, to provide an outer casing which connects end plates 9 and 10 and encloses the circulation turbine.

As a result of this compact arrangement of laser tube 4 and the circulation system, the gas circuit is very short. Dissipation of the heat from the laser gas is effected very effectively inside of the circulation turbine, as stator blades 2 are directly cooled. In the two end plates 9 and 10 the gas flow is deflected on the shortest possible path, so that there are practically no useless gas transport lines such as in conventional convection lasers.

The gas discharge burns between electrodes 13 and 14. For reasons of insulation, the inside wall of discharge tube 1 must be made of ceramic material. The operating potential is applied to electrode 14. Electrode 13 is on earth potential. The ratio of the distance between the electrodes and the total length of discharge tube 1 is selected such that on the one hand the burning voltage is minimized, and on the other hand the excited gas molecules are completely deactivated when they pass through the drift zone which follows the excitation zone.

Deflection of the laser gas stream is effected by means of guide members 15 which are integrated in end plates 9 and 10. In the case of the embodiment with electrodes 13 and 14 mounted in discharge tube 1 which is shown in FIG. 1, gas guide means 15 are preferably so designed that they connect the two annular openings of turbine tube 4 such that they are rotationally symmetric with central discharge tube 1.

Figure 2:
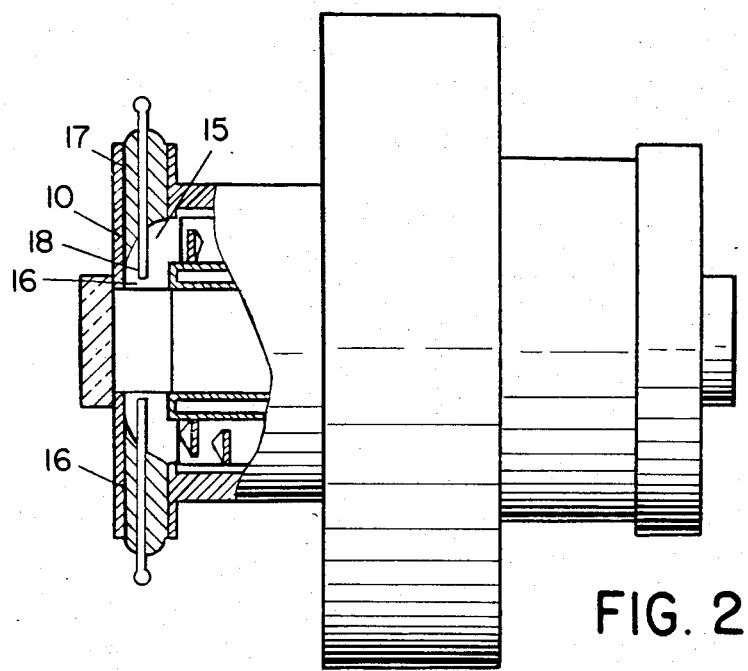
FIG. 2 is an arrangement of the electrodes for the laser shown in FIG. 1.

Another embodiment of the laser covers the arrangement of the gas discharge electrodes or the modification of the deflection ducts as schematically represented in FIG. 2. In this embodiment the periphery of the end plate 10 is provided with several bores 16 at gas inlet end of the discharge tube. Pin electrodes 18 which are provided with insulating tubes 17, are put into bores 16. In this region quide means 15 is subdivided such that the laser gas can flow through several openings into laser tube 1, which now acts as the drift chamber along its whole length. Between each pin electrode 18 and the wall of respective bore 16 a discharge is excited. This type of arrangement has the advantage that the whole laser tube can be made of metal. The excitation zone and resonator zone of the laser are strictly separated and can be optimized individually with respect to favorable operating parameters.

Figure 3:
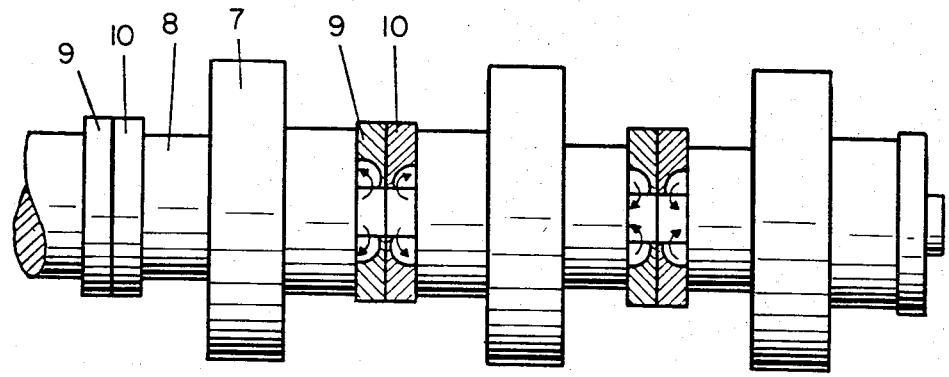
FIG. 3 is an arrangement composed of several autonomous laser segments according to FIG. 1.

As results from FIG. 1 or FIG. 2, one single laser segment can be operated as the laser. The output power ranges between 100 and 500 W, depending on the dimensions of the segment. To achieve an output power in the kW range, a number of such segments can be connected to form a chain as depicted in FIG. 3, with the corresponding suction sides and pressure sides being connected by flanged joints. Depending upon the number and design of the laser segments thus combined, it is then possible to achieve powers ranging between 1 and 10 kW or above.

Figure 4:
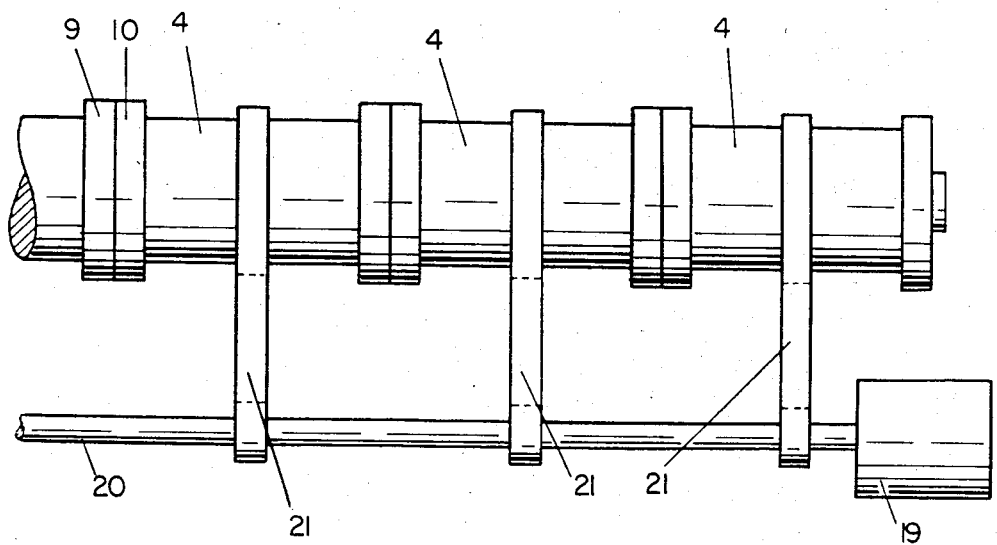
FIG. 4 illustrates driving the circulation turbines shown in FIG. 3.
Figure 5:
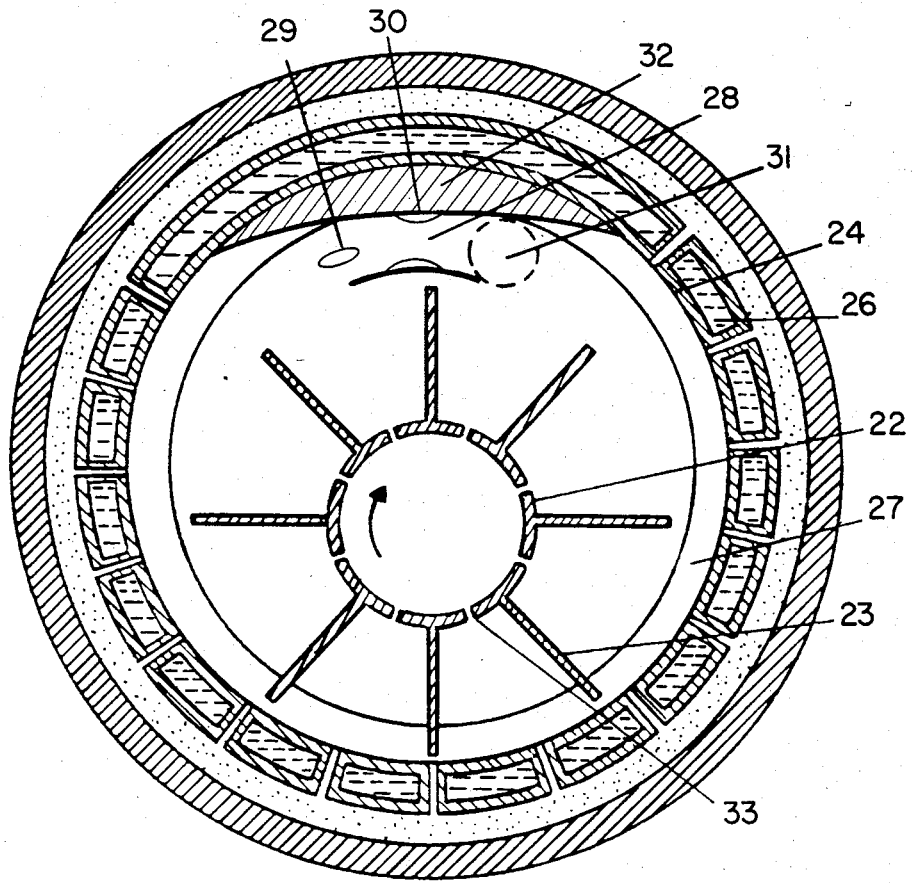
Figure 6:
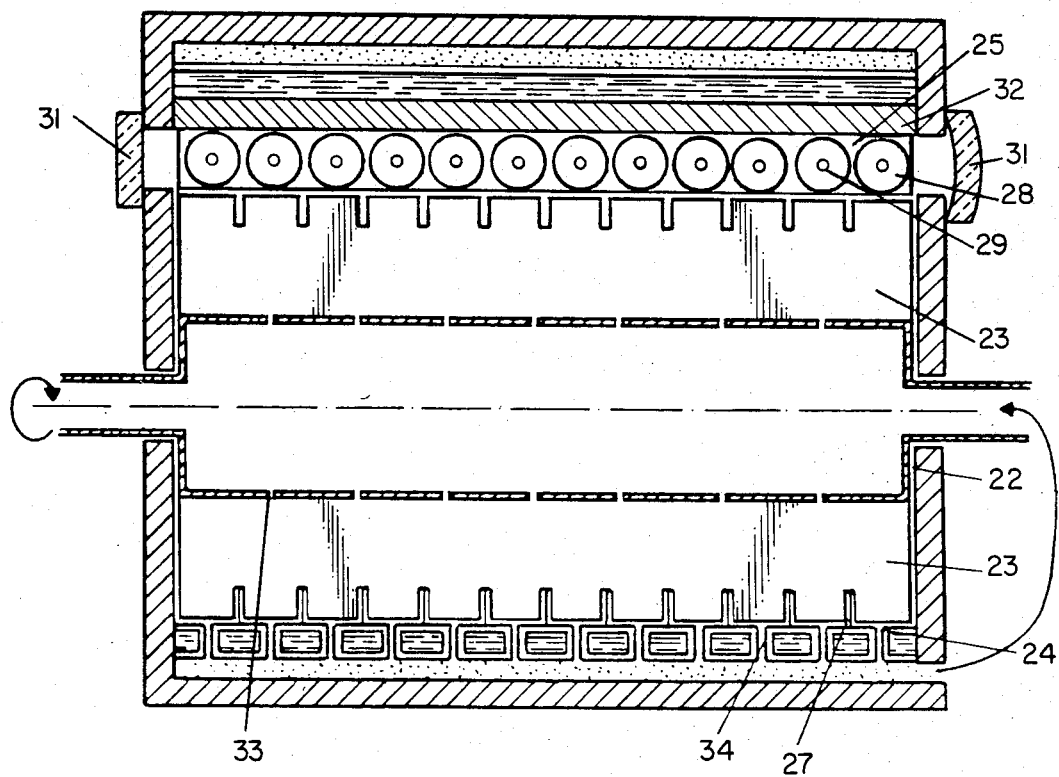

According to FIG. 4, the turbine rotors can be driven by one single motor 19 via shaft 20 which is parallel to the laser. One transmission belt runs from this shaft to each individual turbine rotor 4.

The laser device according to the invention has, for example, a length of 1 m. The cross-sectional area of the discharge chambers then totals 0.05 m². The flow rate in the discharge chambers can be up to 160 m/s. This means that a gas volume of 8 m³/s flows through the discharge chambers. An appropriate gas mixture has the composition $CO_2:N_2:He = 1:7:3$. A vavorable pressure range is between 50 and several hundred torr. Under these conditions, the device which has an inner casing of 1 mm length, has a power output of 8 kW. Higher powers can be achieved if two rows of discharge chambers are provided or if the dimensions of the device are increased or if several devices are connected in series.

We claim:

1. A laser apparatus, for convection gas cooling including a casing enclosing a gas circulation and excitation system, comprising: a laser tube;
a pair of electrodes in said laser tube;
a circulation turbine disposed concentrically about said laser tube; said circulation turbine, during rotation of said circulation turbine causing said gas to flow in a predetermined direction through said laser tube, whereby gas recirculation is maintained within said casing.

2. The laser apparatus as claimed in claim 1 wherein said circulation turbine has stator blades; said laser tube having an outside wall; the stator blades of the circulation turbine are fixed to the outside wall of the laser tube.

3. The laser apparatus as claimed in claim 2 wherein the laser tube and the circulation turbine are closed by end plates provided with a gas guide means.

4. The laser apparatus as claimed in claim 1 wherein a magnet is provided for driving a turbine rotor, the magnet being rotated by the rotary field of a motor.

5. The laser apparatus as claimed in claim 4 wherein the magnet is an annular magnet.

6. The laser apparatus as claimed in claim 4 wherein the turbine rotor is pivoted inside a cylindrical casing and wherein the casing extends between the end plates.

7. The laser apparatus as claimed in claim 6 wherein the turbine rotor is pivoted in the end plates and wherein the bearing is sealed by a sliding seal.

8. The laser apparatus as claimed in claim 28 wherein the sliding seal consists of a magnetic fluid which is introduced into a U-shaped magnet where it is retained.

9. The laser apparatus as claimed in claim 1 wherein an inside wall of the laser tube is composed of an insulating material and wherein a first one of the electrodes is on ground potential at a gas inlet side and the other one of the electrodes is on operating potential and is spaced at a predetermined distance from the first electrode.

10. The laser apparatus as claimed in claim 9 wherein a ratio of the distance between the two electrodes to a total length of the laser tube is such that when a minimum activating voltage applied to said electrode to excite an active gas in the laser tube is achieved, said excited gas is completely deactivated after having left an excitation zone in said laser.

11. The laser apparatus as claimed in claim 10 wherein a plurality of circulating turbines of a plurality of laser devices are driven by one motor via a shaft arranged parallel to the laser axis and via a toothed belt which runs over the outer casing of the respective turbine.

12. The laser apparatus as claimed in claim 1 wherein a plurality of pin electrodes, which are on operating potential, are mounted in bores on a periphery of the end plate located at a gas inlet side, wherein the gas guide leads into the bores and wherein the gas flows into the laser tube through the bores, each bore having a wall, the respective walls of the bores serving as ground electrodes.

13. The laser apparatus as claimed in claim 1 wherein several laser devices are connected gas suction side to gas suction side and gas pressure side to gas pressure side.

* * * * *